Aug. 25, 1936.  N. A. CLARKE  2,051,822
BICYCLE LOCKING DEVICE
Filed Sept. 18, 1935
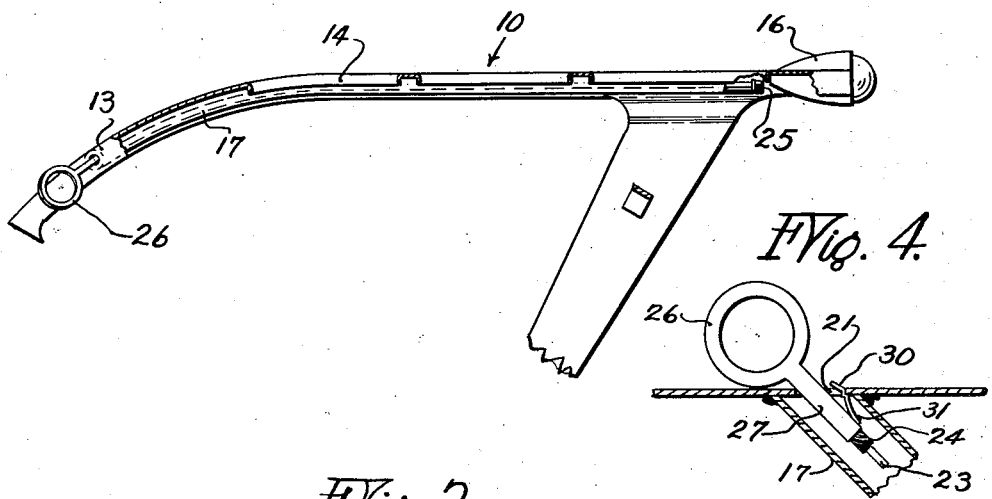
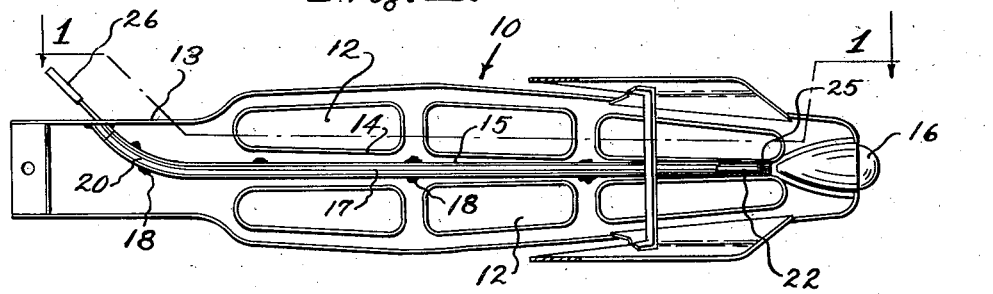
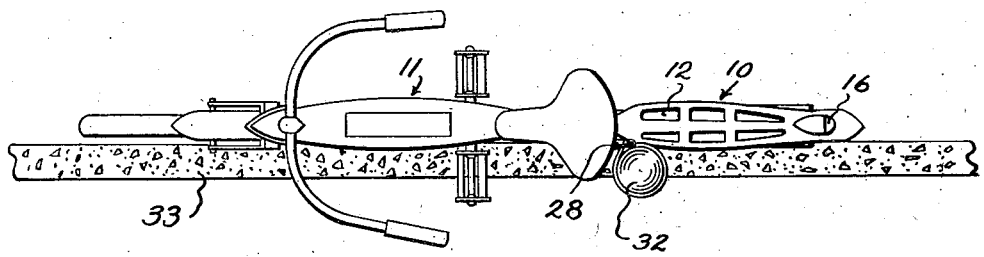
INVENTOR
Norman A. Clarke
BY
Chapin + Neal
ATTORNEYS Patented Aug. 25, 1936

2,051,822

UNITED STATES PATENT OFFICE 2,051,822

BICYCLE LOCKING DEVICE

Norman A. Clarke, Westfield, Mass., assignor to The Westfield Manufacturing Company, Westfield, Mass., a corporation of Massachusetts Application September 18, 1935, Serial No. 41,135

1 Claim. (Cl. 208—45)

This invention relates to means in permanent association with a bicycle frame, or an adjunct thereof, for securing the bicycle temporarily to a post or the like for the purpose of preventing theft of the bicycle and also to prevent damage to the bicycle from accidental tipping over when left unattended.

The principal object of the invention is to provide a device of this character which will serve the above purposes in a more complete manner than devices now customarily in use for the purpose. A further object is to provide a device of this character which, while permanently associated with the bicycle, does not detract from the normal appearance of the bicycle or require any substantial or noticeable change in its structure. Other and further objects will be apparent from the following specification and claim.

In the accompanying drawing,

Fig. 1 is a side view of the luggage carrying member of a bicycle frame structure embodying the present invention, partly in section as viewed substantially on line 1—1 of Fig. 2;

Fig. 2 is a bottom view of the structure shown in Fig. 1, parts being broken away;

Fig. 3 is a detail view, partly in section and on a larger scale, showing the arrangement of the outer end of the cable element; and Fig. 4 is a top view of a bicycle showing one manner of utilizing the device.

Referring to the drawing, 10 designates the luggage carrier element of a bicycle which may be of any suitable form and secured in any suitable manner to the main frame of the bicycle 11 to extend over the rear wheel thereof.

As shown, carrier 10 is formed of sheet metal and provided with openings 12 to lighten and improve the appearance of the carrier. The edge portions of the metal at the sides of the carrier and around the opening are struck downwardly to provide stiffening flanges 13 and 14 respectively. As is clear from Fig. 2, the flanges 14 at the inner sides of the openings 12 form a longitudinal channel 15 on the under side of the carrier. The rear end of the carrier is shown provided with a tail light 16.

A metal tube 17 is positioned within the channel 14 and secured to the carrier in any suitable manner, such as spot welding, indicated at 18. The forward end of the tube 16 is slightly curved as at 20 to bring the forward end of the tube against outer flange 13 and an opening 21 is formed in said flange to afford entrance to the tube.

A flexible cable generally indicated at 22 and preferably comprising a flexible steel core 23 provided with a wrapping of steel wire 24, is slidably positioned in the tube 17. The inner end of the cable 22 is provided with a flanged nut 25, or other form of enlargement, of greater diameter than opening 21, so that substantially the whole length of the cable may be withdrawn from the tube but cannot be removed therefrom completely. The outer end of the cable is provided with a handle 26 preferably in the form of a ring having a shank portion 27. Ring 26 is larger than opening 21 and of a size to receive the arm of a padlock 28 (Fig. 4). A spring catch 30 riveted or otherwise secured to shank 27 at 31 is adapted to releasably engage the edge of opening 21, as shown in Fig. 3, to prevent unintentional withdrawal of the cable.

In one use the cable is drawn from the tube 17, carried around a post or similar object 32, and the arm of padlock 28 passed through ring 26 and around the cable, thereby locking the bicycle to the post in an upright position against the curb 33. Similarly two or more bicycles can be secured together by carrying the cable around one of the frame elements of an adjacent bicycle, or a bicycle may be "locked" by carrying the cable through the spokes of the rear wheel and padlocking the free end to the side of the carrier 10 opposite the opening 21.

When not in use the cable is protected by the tube 17 and is positioned out of sight. The substantially straight position of the cable in its tubular sheath permits its easy withdrawal and return and avoids any substantial bending strain or tension in the steel when the cable is not in use.

It will further be noted that no substantial rearrangement of the carrier or other frame structure of the bicycle is necessitated by the locking device, and that the positioning of the cable carrying sheath beneath the luggage carrier with the opening through which the cable is withdrawn positioned at the forward end of the carrier, closely adjacent the seat support of the bicycle, renders the exposed portion of the device inconspicuous and permits the use of the cable to hold the bicycle upright against the object to which it is secured.

I claim:

A device of the character described which comprises a luggage carrier, adapted to be secured above the rear wheel of a bicycle, said carrier being formed of a sheet of metal the edge portions of which are bent to provide a downwardly extending flange about the edge of the carrier, intermediate portions of the sheet being struck downwardly to form a channel extending longitudinally along the under side of the carrier, an elongated sheath in the form of a metal tube welded to the under side of the carrier within the channel, the forward end of the tube being curved to position the forward end of the tube adjacent said edge flange of the carrier, said flange being provided with an opening affording access to the tube, said opening being of less diameter than the inside diameter of the tube, a flexible cable extending through said opening, the major portion of the cable being slidable into the tube, a ring secured to the outer end of the cable and means secured to the inner end of the cable adapted to engage the flange and prevent complete withdrawal of the cable from the tube.

NORMAN A. CLARKE.